United States Patent
Huang et al.

(10) Patent No.: US 8,379,180 B2
(45) Date of Patent: Feb. 19, 2013

(54) LIQUID CRYSTAL DISPLAY PANEL AND MANUFACTURING METHOD OF OPPOSITE SUBSTRATE THEREOF

(75) Inventors: Yen-Heng Huang, Hsinchu (TW); Chung-Kai Chen, Hsinchu (TW); Shu-Chin Lee, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 1288 days.

(21) Appl. No.: 12/137,525

(22) Filed: Jun. 11, 2008

(65) Prior Publication Data
US 2009/0115947 A1 May 7, 2009

(30) Foreign Application Priority Data
Nov. 5, 2007 (TW) .............................. 96141659 A

(51) Int. Cl.
*G02F 1/1339* (2006.01)
*G02F 1/1335* (2006.01)
*G02F 1/13* (2006.01)

(52) U.S. Cl. ........ 349/157; 349/106; 349/155; 349/158; 349/187

(58) Field of Classification Search .................. 349/106, 349/155, 157–158, 187
See application file for complete search history.

(56) References Cited

U.S. PATENT DOCUMENTS

| | | | |
|---|---|---|---|
| 5,919,532 A | 7/1999 | Sato et al. | |
| 6,002,462 A | 12/1999 | Sato et al. | |
| 6,621,542 B1 * | 9/2003 | Aruga | 349/113 |
| 7,468,776 B2 * | 12/2008 | Tawaraya et al. | 349/155 |
| 2005/0140892 A1 | 6/2005 | Kim et al. | |
| 2006/0028598 A1 | 2/2006 | Lee et al. | |
| 2007/0002263 A1 | 1/2007 | Kim et al. | |

FOREIGN PATENT DOCUMENTS

| | | |
|---|---|---|
| CN | 1400500 | 3/2003 |
| TW | 581904 | 4/2004 |
| TW | 200617438 | 6/2006 |
| TW | I272441 | 2/2007 |

OTHER PUBLICATIONS

"Office Action of Taiwan Counterpart Application", issued on Aug. 27, 2010, p. 1-p. 6, in which the listed references were cited.

* cited by examiner

*Primary Examiner* — Uyen Chau N Le
*Assistant Examiner* — Michael Mooney
(74) *Attorney, Agent, or Firm* — Jianq Chyun IP Office

(57) ABSTRACT

A liquid crystal display (LCD) panel including a color filter on array (COA) substrate, an opposite substrate, and a liquid crystal layer is provided. The opposite substrate has a common electrode, a plurality of main spacers, a plurality of spacer stages disposed on the common electrode and protruding toward the COA substrate, and a plurality of sub-spacers disposed on the common electrode. The main spacers are disposed on the spacer stages to maintain a cell gap between the COA substrate and the opposite substrate. The liquid crystal layer is disposed between the COA substrate and the opposite substrate. The above-mentioned LCD panel is an LCD panel with hybrid spacers having the main spacers and the sub-spacers.

15 Claims, 4 Drawing Sheets

LIQUID CRYSTAL DISPLAY PANEL AND MANUFACTURING METHOD OF OPPOSITE SUBSTRATE THEREOF

CROSS-REFERENCE TO RELATED APPLICATION

This application claims the priority benefit of Taiwan application serial no. 96141659, filed on Nov. 5, 2007. The entirety of the above-mentioned patent application is hereby incorporated by reference herein and made a part of specification.

BACKGROUND OF THE INVENTION

1. Field of the Invention

The present invention relates to an LCD panel and a manufacturing method of an opposite substrate thereof. More particularly, the present invention relates to an LCD panel with hybrid spacers and a manufacturing method of an opposite substrate thereof.

2. Description of Related Art

LCDs, having advantages of high image quality, small volume, light weight, low driving voltage, low power consumption, and wide application range have replaced cathode ray tubes (CRTs) and become mainstream new-generation displays. A conventional LCD panel is constituted by a color filter substrate, a thin film transistor array substrate (TFT array substrate), and a liquid crystal layer disposed between the two substrates. However, the resolution of the LCD panel is poor, the pixel aperture ratio is low, and misalignment may easily occur when the color filter substrate and the TFT array substrate are bonded.

To solve the above problem, a conventional LCD panel is formed by a COA substrate, an opposite substrate, a plurality of spacers, and a liquid crystal layer. The spacers and the liquid crystal layer are disposed between the COA substrate and the opposite substrate, and the spacers are used to maintain the cell gap between the COA substrate and the opposite substrate. In the LCD panel, as the color filter film is directly formed on the TFT array substrate, misalignment will not occur easily. Moreover, the LCD panel achieves a good resolution and a high pixel aperture ratio.

However, it should be noted that the above conventional LCD panel adopts ball spacers. Since the distribution of the ball spacers is difficult to control, and the ball spacers may located at different height levels due to the roughness of the surface of the TFT array substrate, the ball spacers cannot provide uniform cell gap between the TFT array substrate and the opposite substrate. Therefore, it is difficult for the LCD panel to maintain the cell gap between the COA substrate and the opposite substrate under the pressure of an external force, and thus the optical characteristic of the display panel is affected, leading to a non-uniform display.

SUMMARY OF THE INVENTION

The present invention is directed to an LCD panel with hybrid spacers.

The present invention is directed to a method of manufacturing an opposite substrate, so as to simultaneously form a plurality of spacer stages and a plurality of alignment marks on the substrate.

The present invention provides, an LCD panel, which includes a COA substrate, an opposite substrate, and a liquid crystal layer. The opposite substrate has a common electrode, a plurality of main spacers, a plurality of spacer stages disposed on the common electrode and protruding toward the COA substrate, and a plurality of sub-spacers disposed on the common electrode. The main spacers are disposed on the spacer stages to maintain a cell gap between the COA substrate and the opposite substrate. The liquid crystal layer is disposed between the COA substrate and the opposite substrate.

In an embodiment of the present invention, the COA substrate includes a substrate, a plurality of scan lines, a plurality of data lines, a plurality of TFTs, a plurality of color filter films, and a plurality of pixel electrodes. The scan lines, data lines, and TFTs are disposed on the substrate, and the TFTs are electrically connected to one of the scan lines and one of the data lines correspondingly. The color filter films cover the scan lines, data lines, and TFTs. The pixel electrodes are disposed on the color filter films, and electrically connected to the TFTs.

In an embodiment of the present invention, the color filter films include red filter films, green filter films, and blue filter films.

In an embodiment of the present invention, the pixel electrodes include transparent electrodes, reflective electrodes, and transflective electrodes.

In an embodiment of the present invention, the COA substrate further includes an overcoat layer made of a transparent material and disposed between the color filter films and the pixel electrodes. The material of the overcoat layer is, for example, an organic material of high coverage.

In an embodiment of the present invention, the opposite substrate further has a plurality of alignment marks, and the sub-spacers are located in a region outside the spacer stages and the alignment marks.

In an embodiment of the present invention, a height of the sub-spacers is lower than that of the main spacers.

In an embodiment of the present invention, the opposite substrate further has a plurality of alignment protrusions disposed in pixel units and used for liquid crystal alignment.

In an embodiment of the present invention, materials of the common electrode, the spacer stages, and the alignment marks are the same.

In an embodiment of the present invention, the materials of the common electrode, the spacer stages, and the alignment marks include transparent conductive oxide (TCO).

In an embodiment of the present invention, the materials of the common electrode, the spacer stages, and the alignment marks are different.

In an embodiment of the present invention, the material of the common electrode includes TCO, the material of the spacer stages includes a metal or a resin material, and the material of the alignment marks includes a metal or a resin material.

The present invention further provides a method of manufacturing an opposite substrate, which includes the following steps. First, a substrate is provided. Then, a common electrode, a plurality of spacer stages, and a plurality of alignment marks are formed on the substrate. After that, a plurality of main spacers is formed on the common electrode, and the main spacers are disposed on the spacer stages.

In an embodiment of the present invention, a forming method of the common electrode, the spacer stages, and the alignment marks includes the following steps. First, an electrode material layer is formed on the substrate. Then, a thickness of the electrode material layer in partial region is reduced, so as to simultaneously form the common electrode, the spacer stages, and the alignment marks.

In an embodiment of the present invention, a method of forming the common electrode, the spacer stages, and the alignment marks includes the following steps. First, a common electrode is formed on the substrate. Then, the spacer stages and the alignment marks are simultaneously formed on the common electrode.

In an embodiment of the present invention, the forming method of the main spacers includes a photolithography and etching process or an inkjet printing process.

In an embodiment of the present invention, the method of manufacturing an opposite substrate further includes forming a plurality of sub-spacers on the common electrode. The sub-spacers are disposed on the common electrode, located in a region outside the spacer stages and the alignment marks, and adjacent to the main spacers.

As the LCD panel of the present invention has hybrid spacers, the LCD panel can easily maintain the cell gap between the COA substrate and the opposite substrate under the pressure of an external force, the pressure resistance of the panel, and the stability of the panel bonding process. Further, the alignment marks can be formed when the spacer stages are formed on the opposite substrate of the present invention, such that the COA substrate and the opposite substrate are aligned during the bonding process through the alignment marks.

In order to make the aforementioned and other objectives, features, and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
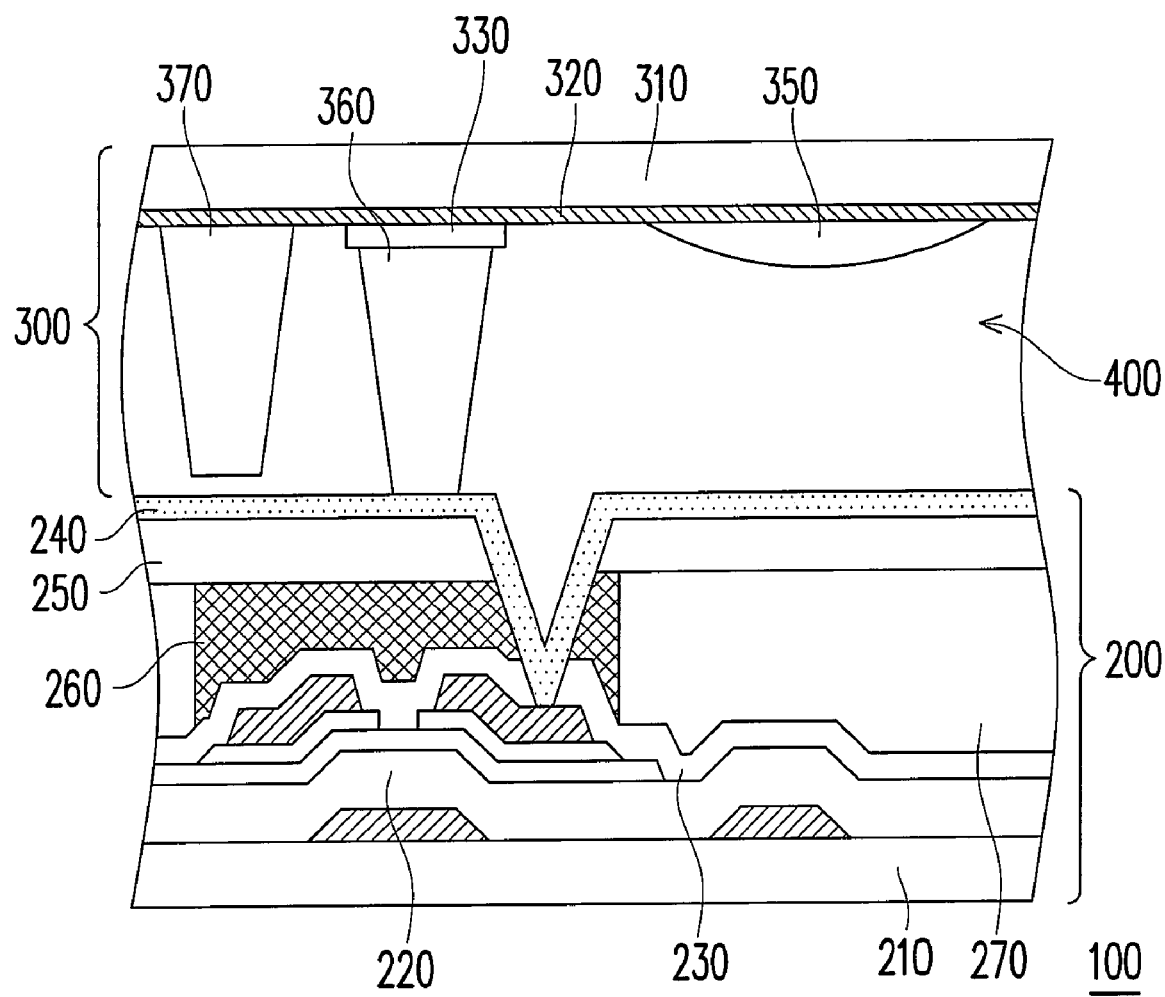
FIG. 1 is a schematic structural view of an LCD panel according to an embodiment of the present invention.

FIG. 1 is a schematic structural view of an LCD panel according to an embodiment of the present invention. Referring to FIG. 1, the LCD panel 100 of this embodiment includes a COA substrate 200, an opposite substrate 300, and a liquid crystal layer 400 disposed between the COA substrate 200 and the opposite substrate 300.

The COA substrate 200 includes a substrate 210, a plurality of scan lines (not shown), a plurality of data lines (not shown), a plurality of TFTs 220, a plurality of color filter films 270, and a plurality of pixel electrodes 240. The scan lines, data lines, and TFTs 220 are all disposed on the substrate 210. The scan lines and the data lines are interlaced to form pixel regions arranged in an array. The TFT 220 in each pixel region is electrically connected to one of the scan lines and one of the data lines correspondingly. The passivation layer 230 is covered on the TFTs 220, and a black matrix 260 may be optionally formed on the TFTs 220, the scan lines, and the data lines, so as to reduce light leakage occurred at the edge of the pixels.

Further, the black matrix 260 may not be formed on the color filter films 270 of the TFT array substrate 200, and light leakage may by shielded by the stacked color filter films 270, or the black matrix 260 may be fabricated on the opposite substrate 300 to reduce the light leakage occurred at the edge of the pixels. The color filter film 270 in a sub-pixel region of each pixel region may be at least one of, for example, a red filter film, a green filter film, or a blue filter film, and covers the scan lines, data lines, and TFTs 220.

Moreover, the pixel electrodes 240 are, for example, transparent electrodes, disposed on the color filter films 270, and electrically connected to the corresponding TFTs 220. In other embodiments (not shown), the pixel electrodes 240 may also be reflective electrodes or transflective electrodes. In addition, the COA substrate 200 further may further include an overcoat layer 250 disposed between the color filter films 270 and the pixel electrodes 240. The overcoat layer 250 may be a planar layer and is made of a transparent material, which is, for example, an organic material, or an inorganic material, such as silicon nitride or silicon oxide.

Further, the opposite substrate 300 has a substrate 310, a common electrode 320, a plurality of spacer stages 330, a plurality of main spacers 360, and a plurality of sub-spacers 370. The spacer stages 330 can be made of a transparent material or an opaque material. The common electrode 320 is disposed on the substrate 310, and is made of, for example, transparent conductive oxide (TCO), such as indium tin oxide (ITO). The spacer stages 330 and sub-spacers 370 are all disposed on the common electrode 320. Moreover, when the COA substrate 200 and the opposite substrate 300 are bonded, the spacer stages 330 protrude toward the COA substrate 200.

In addition, the main spacers 360 are disposed on the spacer stages 330 to maintain a cell gap between the COA substrate 200 and the opposite substrate 300. The position or distribution of the main spacers 360 may be determined according to design requirements. One main spacer 360 may be disposed in every pixel region, and even in every sub-pixel region, or one main spacer 360 is disposed periodically in every few pixels. Further, the sub-spacers 370 are located in the region outside the spacer stages 330, such that the sub-spacers 370 have a lower height than the main spacers 360. The sub-spacers 370 may be arranged freely in the region outside the spacer stages 330. The sub-spacers 370 may be disposed adjacent to the main spacers 360, or replace a part of the main spacers 360, so as to be arranged in a staggered way with the main spacers 360. When the LCD panel 100 is pressed by an external force, the sub-spacers 370 maintain the cell gap between the COA substrate 200 and the opposite substrate 300. Thus, the LCD panel 100 becomes an LCD panel with hybrid spacers having the main spacers 360 and the sub-spacers 370. The hybrid spacers (i.e. the main spacers 360 and the sub-spacers 370) can enhance the pressure resistance of the LCD panel 100, Cell assemble process window and the stability of the bonding process.

Figure 3:
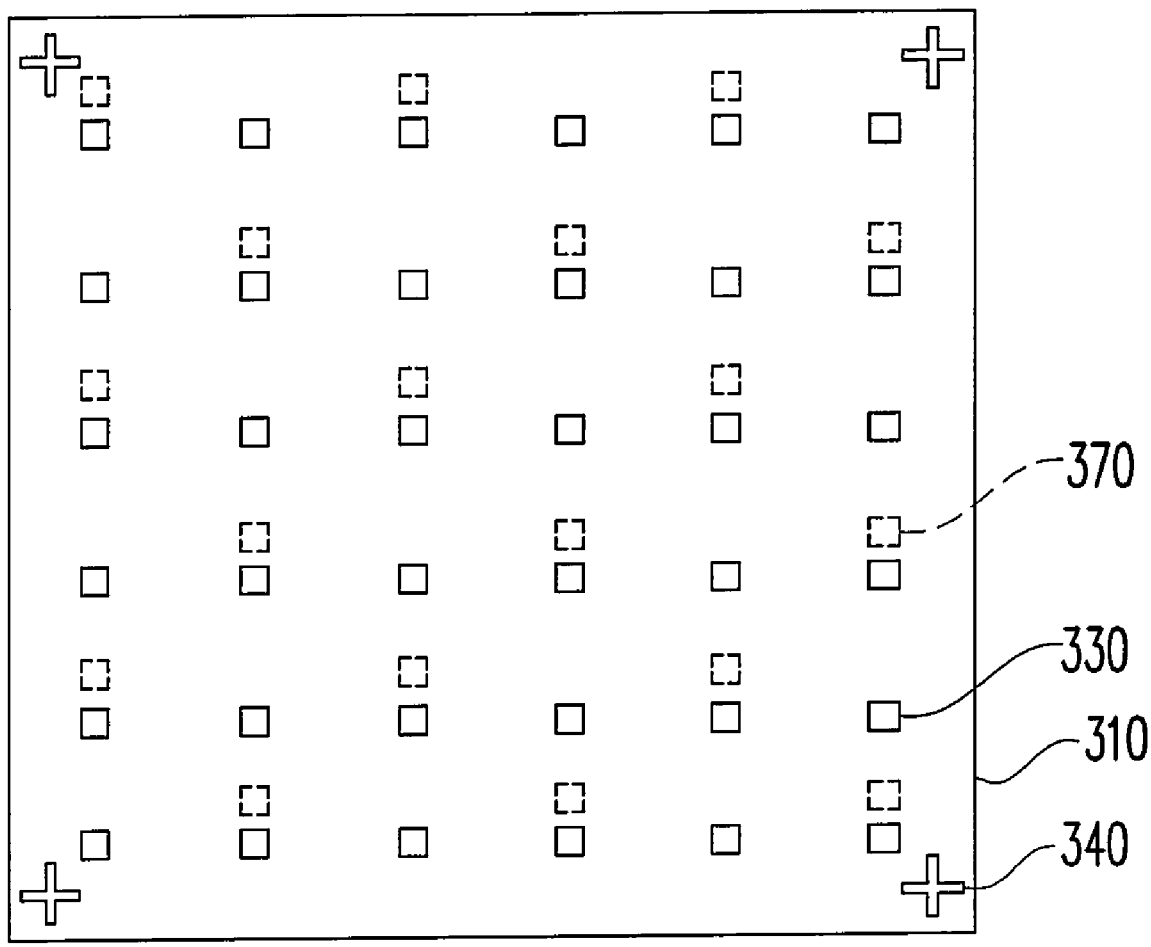
FIG. 3 is a top view of FIG. 2B.

Besides, the opposite substrate 300 may further include a plurality of alignment marks 340 (as shown in FIG. 3), and the sub-spacers 370 are located in the region outside the alignment marks 340. The COA substrate 200 and the opposite substrate 300 may be aligned during the assembling process through the alignment marks 340 to form the LCD panel 100. In this embodiment, the materials of the spacer stages 330 and the alignment marks 340 may be TCO, a metal material, or a resin material.

Further, the opposite substrate 300 may also include a plurality of alignment protrusions 350 disposed on the common electrode 320 and located in the region outside the spacer stages 330 and the alignment marks 340. At least one alignment protrusion 350 is disposed in each pixel region, for orientating liquid crystal molecules in the liquid crystal layer 400 to be arranged in multi-directions, so as to obtain a plurality of different alignment domains. Thereby, the LCD panel 100 becomes a multi-domain vertical alignment (MVA) LCD panel with a wide viewing angle. A method of manufacturing the opposite substrate 300 will be illustrated in the following embodiments.

Figure 2A:
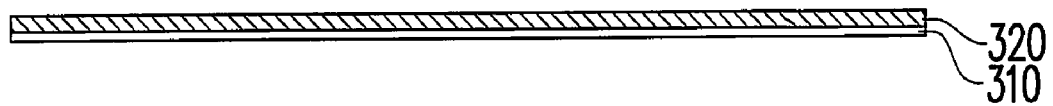
FIGS. 2A to 2C are schematic views of a method of manufacturing an opposite substrate in FIG. 1.
Figure 2B:
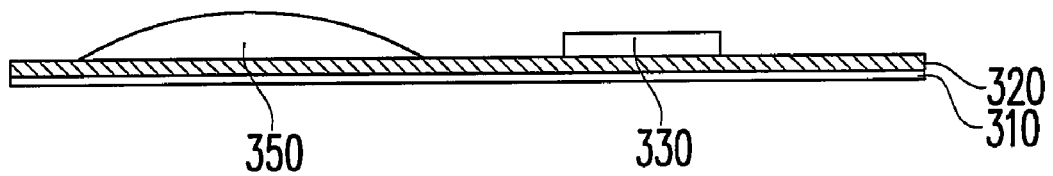
Figure 2C:
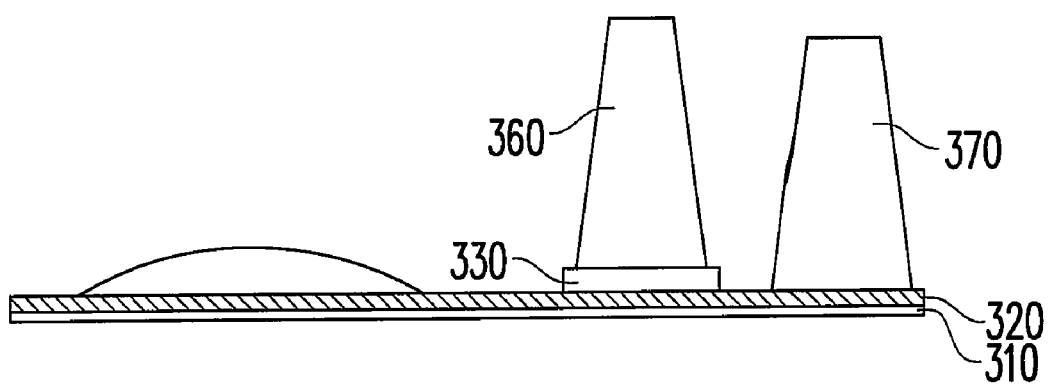

FIGS. 2A to 2C are schematic views of a method of manufacturing an opposite substrate in FIG. 1, and FIG. 3 is a top view of FIG. 2B. First referring to FIG. 2A, a substrate 310 is provided, and then an electrode material layer (not shown) is formed on the substrate 310. The substrate 310 is a transparent substrate such as a glass substrate or a plastic substrate, and the material of the electrode material layer is a transparent conductive material such as indium tin oxide (ITO) or indium zinc oxide (IZO). After that, a portion of the electrode material layer is removed to form a common electrode 320.

Next, referring to FIGS. 2B and 3, a spacer stage material layer (not shown) is formed on the substrate 310, and is made of a TCO such as ITO or IZO. However, in other embodiments, the material of the spacer stage material layer may also be a metal or a resin material. Afterwards, a portion of the spacer stage material layer is removed to form a plurality of spacer stages 330 and a plurality of alignment marks 340 on the common electrode 320. Moreover, a plurality of alignment protrusions 350 may be formed on the common electrode 320 at the same time. The alignment protrusions 350 are disposed in the pixel regions, and located in the region outside the spacer stages 330 and the alignment marks 340.

In addition, the common electrode 320 and the spacer stages 330 and alignment marks 340 disposed on the common electrode 320 may be formed by two steps. In another embodiment (not shown), the common electrode 320 and the spacer stages 330 and alignment marks 340 disposed on the common electrode 320 may be formed by the same process. For example, the electrode material layer is first formed on the substrate 300. Then, a removal process is performed with a half-tone mask or a multi-tone mask to reduce the thickness of the electrode material layer in partial region, so as to form the common electrode 320, the spacer stages 330, and the alignment marks 340. The common electrode 320, the spacer stages 330, and the alignment marks 340 may have different heights and the materials thereof are transparent TCO. The spacer stages 330 and the alignment marks 340 are higher. The alignment marks 340 and the common electrode 320 have different light transmittances due to different thicknesses, thereby achieve the purpose of aligning through the alignment marks 340. Further, if the spacer stages 330 and alignment marks 340 are made of a metal or a resin material, the above process is still applicable.

Similarly, a plurality of alignment protrusions 350 may be formed on the common electrode 320 at the same time, and located in pixel regions outside the spacer stages 330 and the alignment marks 340.

Referring to FIG. 2C, a photolithography and etching process (PEP) or an inkjet printing process (IJP) is performed on the substrate 310, so as to form a plurality of main spacers 360 and a plurality of sub-spacers 370 on the common electrode 320. The main spacers 360 are disposed on the spacer stages 330, and the sub-spacers 370 are located in the region outside the spacer stages 330 and the alignment marks 340 (as shown in FIG. 3), such that the height of the sub-spacers 370 is lower than that of the main spacers 360. Till now, the fabrication of the opposite substrate 300 of this embodiment is substantially finished. FIG. 3 is a schematic view, in which one main spacer 360 is disposed every few pixel regions.

Figure 4:
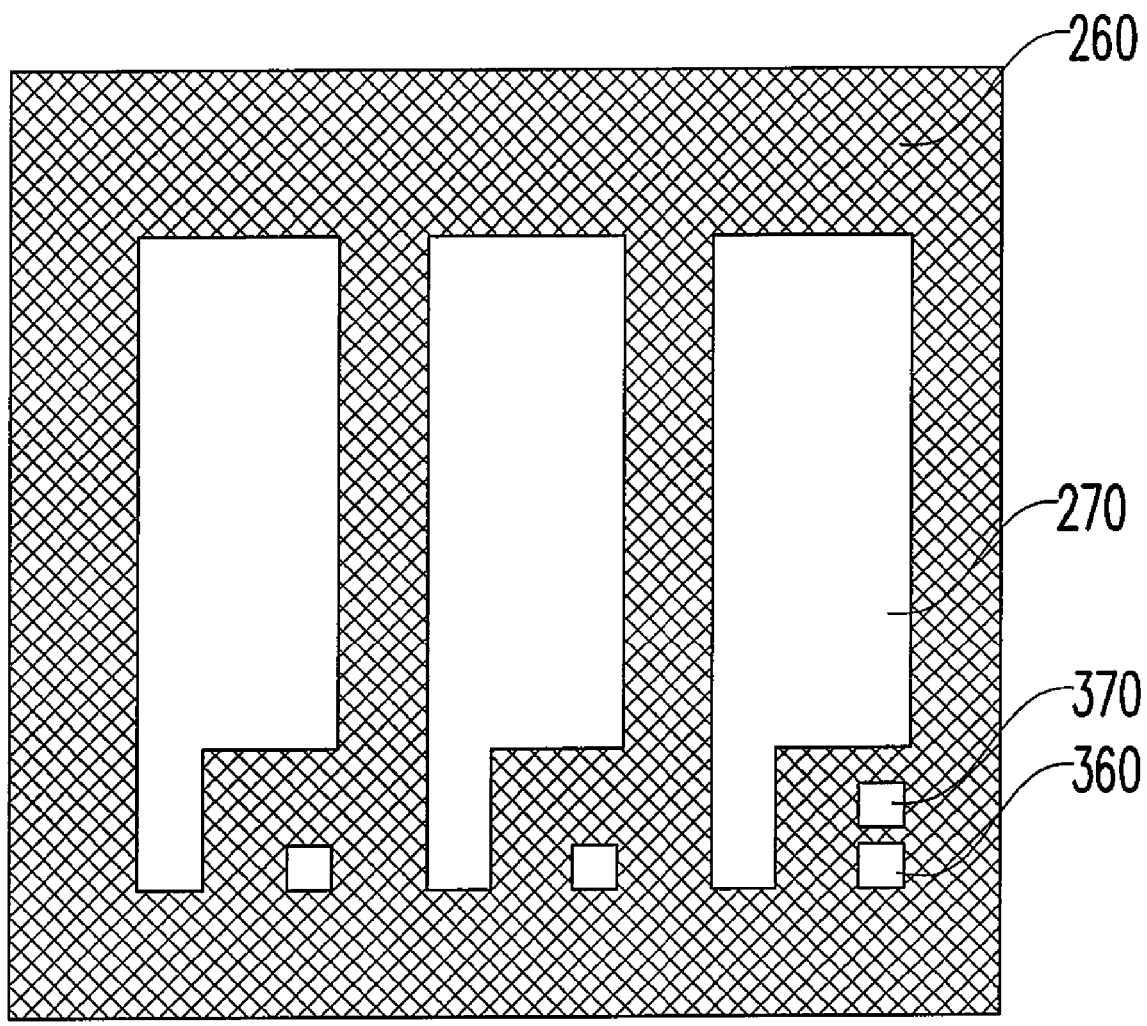
FIG. 4 is a schematic top view of pixel regions according to an embodiment of the present invention.

FIG. 4 is a schematic top view of pixel regions according to an embodiment of the present invention. Referring to FIG. 4, the position or distribution of the main spacers 360 may be determined according to design requirements. In other words, one main spacer 360 may be disposed in every pixel region, or even in every sub-pixel region, as shown in FIG. 4. Further, the sub-spacers 370 may be disposed adjacent to the main spacers 360, or replace a part of the main spacers 360, so as to be arranged in a staggered way with the main spacers 360.

In view of the above, the present invention provides an LCD panel with hybrid spacers to provide good structural strength and assemble process window. The main spacers stably maintain a cell gap between the COA substrate and the opposite substrate. Moreover, when the LCD panel is pressed by an external force, the sub-spacers can maintain the cell gap between the COA substrate and the opposite substrate, so as to prevent the optical characteristic of the panel from being influenced by the variation of the thickness of the liquid crystal layer to cause non-uniform display. Therefore, the LCD panel of the present invention not only has a better pressure resistance, and also provides a good stability in bonding process.

Further, in the present invention, the alignment marks may be formed when the spacer stages are formed on the common electrode of the opposite substrate, so an additional process for forming the alignment marks is not required.

Besides, the COA substrate and the opposite substrate may be aligned during the bonding process through the alignment marks, which is much simpler.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A liquid crystal display (LCD) panel, comprising:
a color filter on array (COA) substrate;
an opposite substrate comprising a common electrode, a plurality of main spacers, a plurality of spacer stages disposed on the common electrode and protruding toward the COA substrate, a plurality of sub-spacers disposed on the common electrode, and a plurality of alignment marks, wherein the main spacers are disposed on the spacer stages to maintain a cell gap between the COA substrate and the opposite substrate, and materials of the spacer stages and the alignment marks are the same; and
a liquid crystal layer disposed between the COA substrate and the opposite substrate.
2. The LCD panel as claimed in claim 1, wherein the COA substrate comprises:
a substrate;
a plurality of scan lines disposed on the substrate;
a plurality of data lines disposed on the substrate;
a plurality of thin film transistors (TFTs) disposed on the substrate and electrically connected to one of the scan lines and one of the data lines correspondingly;
a plurality of color filter films covering the scan lines, the data lines, and the TFTs; and
a plurality of pixel electrodes disposed on the color filter films and electrically connected to the TFTs.

3. The LCD panel as claimed in claim 2, wherein the color filter films comprise red filter films, green filter films, and blue filter films.

4. The LCD panel as claimed in claim 2, wherein the pixel electrodes comprise transparent electrodes, reflective electrodes, and transflective electrodes.

5. The LCD panel as claimed in claim 2, wherein the COA substrate further comprises an overcoat layer disposed between the color filter films and the pixel electrodes.

6. The LCD panel as claimed in claim 1, wherein the sub-spacers are located in a region outside the spacer stages and the alignment marks.

7. The LCD panel as claimed in claim 6, wherein a height of the sub-spacers is lower than that of the main spacers.

8. The LCD panel as claimed in claim 1, wherein the opposite substrate further comprises a plurality of alignment protrusions disposed on the common electrode, and located in the region outside the spacer stages and the alignment marks.

9. The LCD panel as claimed in claim 1, wherein a material of the common electrode is different from the materials of the spacer stages, and the alignment marks.

10. The LCD panel as claimed in claim 1, wherein the material of the common electrode comprises TCO, the materials of the spacer stages and alignment marks comprise a metal or a resin material.

11. A method of manufacturing an opposite substrate, comprising:
   providing a substrate;
   forming a common electrode on the substrate;
   forming a plurality of spacer stages and a plurality of alignment marks on the common electrode, wherein the materials of the spacer stages and alignment marks are the same; and
   forming a plurality of main spacers on the common electrode, wherein the main spacers are disposed on the spacer stages.

12. The method of manufacturing an opposite substrate as claimed in claim 11, wherein a forming method of the main spacers comprises a photolithography and etching process or an inkjet printing process.

13. The method of manufacturing an opposite substrate as claimed in claim 11, further comprising forming a plurality of sub-spacers on the common electrode, wherein the sub-spacers are disposed on the common electrode and located in a region outside the spacer stages and the alignment marks.

14. A method of manufacturing a liquid crystal display (LCD) panel, comprising:
   providing a substrate;
   forming a common electrode on the substrate;
   forming a plurality of spacer stages and a plurality of alignment marks on the common electrode, wherein the materials of the spacer stages and alignment marks are the same;
   forming a plurality of main spacers on the common electrode, wherein the main spacers are disposed on the spacer stages; and
   assembling the substrate to a color filter on array (COA) substrate.

15. A liquid crystal display (LCD) panel, comprising:
   a first substrate having a plurality of color filter films and a thin film transistor array;
   a second substrate an opposite substrate comprising a plurality of spacer stages disposed on the second substrate and protruding toward the first substrate, a plurality of main spacers, a plurality of sub-spacers disposed on the second substrate, and a plurality of alignment marks disposed on the second substrate, wherein the main spacers are disposed on the spacer stages to maintain a cell gap between the first substrate and the second substrate, and materials of the spacer stages and the alignment marks are the same; and
   a liquid crystal layer disposed between the first substrate and the second substrate.

* * * * *